Patented Mar. 22, 1932

1,850,875

UNITED STATES PATENT OFFICE

EDUARD HAGENBACH, CARL METTLER, AND ERICH WANNER, OF BASEL, SWITZERLAND, ASSIGNORS TO THE FIRM OF J. R. GEIGY S. A., OF BASEL, SWITZERLAND

MANUFACTURE OF DYEING CONVERSION PRODUCTS OF AZO-DYESTUFFS

No Drawing. Application filed February 6, 1929, Serial No. 338,026, and in Germany February 20, 1928.

This invention relates to dyeing products from azo-dyestuffs and has among others the object to produce dyestuffs particularly suitable for dyeing leather.

With this and other objects in view such as may be obvious to those versed in the art or may hereinafter appear, the present invention in one of its aspects consists in treating mono- or polyazo dyestuffs containing resorcin as a component, in the presence of ammonia with an oxidizing agent. Preferably air is employed as the oxidizing agent and heat is used during the reaction.

In this manner new dyeing products from azo-dyestuffs are formed which are still azo-dyestuffs, but of which the exact constitution cannot be given. The technical effect obtained thereby is very surprising. The original dyestuffs which yield mostly yellow to red dyeings become brown to red-brown dyestuffs that are no longer capable of dyeing wool or silk or have only a little dyeing effect thereon, but which have taken an increased dyeing power on leather. The dyes produced on leather are characterized by mainly brown to brown-violet tints of excellent fastness to light and alkaline fat liquor.

According to a simple form of the process the intial substances are treated with air in watery ammonia at increased temperature, preferably at a temperature of at least 70° C. Such oxidation takes place even at ordinary temperature, but takes considerably longer. Also, other oxidizing agents, such for example as $MnO_2$ can be used, the essential feature being the presence of ammonia until the conversion has been concluded.

The following example illustrates the details of the improved process, the parts being by weight:

A solution of 24 parts of the monoazo-dyestuff from 1-amino benzene-4-sulphonic acid and resorcin in 100–150 parts of water is mixed with 30–50 parts of ammonia of 20% strength and air is passed through at 70–80° C. whilst stirring. The initially pure yellow orange solution soon becomes deep brown and the oxidation is continued until the coloration and strength of the solution do not change further, which is the case after a few hours. Then acidification with hydrochloric acid is effected, precipitation with common salt, and filtering and drying. The ammonia salt solution may also be directly concentrated by evaporation.

The dyestuff forms a dark powder, soluble in water with a yellow brown coloration, and also soluble in concentrated sulphuric acid with a yellow brown coloration. Whilst wool in an acid bath is hardly dyed thereby, it produces on leather a dark yellow brown to brown according to the degree of oxidation.

In the following table are set out a few color reactions and the dye tints of the initial and conversion dyestuffs for a number of examples.

Table

| Constitution | Azo combination | | | Azo body oxidized in presence of ammonia | | |
|---|---|---|---|---|---|---|
| | Coloration on leather | Aqueous solution of the dye acid | Solution in $H_2SO_4$ concentrated | Coloration on leather | Aqueous solution of the $NH_4$-salt | Solution in $H_2SO_4$ concentrated |
| Sulphanilic acid→resorcin | Yellow | Yellow | Yellow | Brown | Yellow-brown | Yellow-brown |
| Amino-oxy-benzene sulpho-carboxylic acid 2.1.4.6→resorcin. | Orange | Yellow-orange | Orange | Brown | Brown | Brown |
| Naphthylamine-sulphonic acid 1.4 →resorcin. | Yellow | Brown-orange | Red-brown | Brown | Brown | Brown-violet |
| Naphthylamine - disulphonic - acid 2.3.6→resorcin. | Orange | Yellow-orange | Red-orange | Brown | Yellow-brown | Red-brown |
| Sulphanilic acid ↘ resorcin Aniline ↗ | Yellow | Yellow | Yellow-brown | Yellow-brown | Yellow-brown | Brown |
| Amino-azo-benzene disulphonic acid →resorcin. | Red | Orange | Blue | Brown | Brown | Black |
| Benzidine ↙ naphthol - disulphonic acid 2.6.8. ↖ resorcin. | Red | Red-orange | Red-violet | Violet | Red-brown | Violet |

What we claim is:—

1. A process for the production of dyeing products from azo-dyestuffs, comprising subjecting a monoazo dyestuff formed by coupling a diazotized amino-sulfonic acid compound of the benzene and naphthalene series with resorcin, to the action of an oxidizing agent in the presence of ammonia.

2. A process for the production of dyeing products from azo-dyestuffs, comprising subjecting a monoazo dyestuff formed by coupling a diazotized amino-sulfonic acid compound of the benzene and naphthalene series with resorcin, to the action of air passed therethrough in the presence of ammonia and preferably at a temperature of at least 70° C.

3. As new articles of manufacture the dyeing products from azo-dyestuffs obtained by subjecting a monoazo dyestuff formed by coupling a diazotized amino-sulfonic acid compound of the benzene and naphthalene series with resorcin, to the action of an oxidizing agent in the presence of ammonia, said dyeing products being dark powders, soluble in water with a yellow brown to a red brown coloration, soluble in sulphuric acid with a yellow-brown to black coloration, dyeing wool with difficulty in an acid bath, yielding on leather yellow brown to violet tints of great fastness to light and alkaline fat liquor.

In witness whereof we have hereunto signed our names this 25th day of January, 1929.

EDUARD HAGENBACH.
CARL METTLER.
ERICH WANNER.